United States Patent [19]

Perhach et al.

[11] Patent Number: 4,715,215
[45] Date of Patent: Dec. 29, 1987

[54] METHOD AND APPARATUS FOR TESTING THE FLUID-TIGHT SEALED INTEGRITY OF A HERMETICALLY-SEALED PACKAGE IN A RAPIDLY-STABILIZED ENVIRONMENT

[75] Inventors: John M. Perhach, Amherst; Charles E. Porter, Jr., Niagara Falls; David C. Maloney, Alden, all of

[73] Assignee: The Aro Corporation, Bryan, Ohio

[21] Appl. No.: 914,239

[22] Filed: Oct. 2, 1986

Related U.S. Application Data

[63] Continuation-in-part of Ser. No. 727,128, Apr. 25, 1985, abandoned.

[51] Int. Cl.$^4$ .............................................. G01M 3/02
[52] U.S. Cl. ........................................ 73/49.3; 73/45.4
[58] Field of Search ......................... 73/49.3, 45.4, 52

[56] References Cited

U.S. PATENT DOCUMENTS

| | | | |
|---|---|---|---|
| 3,117,441 | 1/1964 | Zimmerman | 73/37 |
| 3,751,9872 | 8/1973 | Hass | 73/45.5 |
| 3,837,215 | 9/1974 | Massage | 73/45.4 |
| 3,918,293 | 11/1975 | Feigel | 73/49.3 |
| 4,517,827 | 5/1985 | Tapscott | 73/45.4 |
| 4,663,964 | 5/1987 | Croce | 73/49.3 |

FOREIGN PATENT DOCUMENTS

| | | | |
|---|---|---|---|
| 181722 | 5/1986 | European Pat. Off. | 73/49.3 |
| 2351400 | 5/1976 | France | 73/49.3 |
| 202340 | 10/1985 | Japan | 73/49.3 |
| 2059381 | 4/1981 | United Kingdom | 73/49.3 |

Primary Examiner—Stewart J. Levy
Assistant Examiner—Hezron E. Williams
Attorney, Agent, or Firm—Sommer & Sommer

[57] ABSTRACT

A leak detector is adapted to test the fluid-tight sealed integrity of a hermetically-sealed package having a movable wall portion. An enclosure surrounds a package-to-be-tested, and the space within the enclosure is evacuated by a vacuum pump. As the pressure acting on the outer surface of the package begins to fall, the gas within the package will be expand, pushing the movable wall portion outwardly. Such displacement of the movable wall portion is sensed and compared with a predetermined value. If desired, the reduced pressure within the enclosure may be held constant for as time interval, and the sensor used to determine whether the distended wall portion has relaxed.

3 Claims, 7 Drawing Figures

METHOD AND APPARATUS FOR TESTING THE FLUID-TIGHT SEALED INTEGRITY OF A HERMETICALLY-SEALED PACKAGE IN A RAPIDLY-STABILIZED ENVIRONMENT

CROSS-REFERENCE TO RELATED APPLICATION

This application is a continuation-in-part of pending U.S. patent application Ser. No. 06/727,128, filed Apr. 25, 1985 now abandoned.

SUMMARY OF THE INVENTION

A leak detector for testing the fluid-tight sealed integrity of a hermetically-sealed package, broadly includes: an enclosure; a package-to-be-tested arranged within the enclosure, the package having a wall enclosing a chamber therewithin, a portion of the wall being movable in response to a pressure differential thereacross, the chamber containing a fluid; a vacuum pump operable to selectively reduce the pressure within the enclosure for permitting the fluid within the chamber to expand and for permitting the wall portion to move; a sensor arranged to sense displacement of the wall portion while the pressure within the enclosure is reduced nd operable to provide a signal as a function of such sensed displacement; and a comparator arranged to compare the sensor signal with a predetermined value, and operable to provide one output signal if the sensor signal is greater than the predetermined value and another output signal if the sensor signal is less than the predetermined value. If desired, a fluid-powered actuator may be provided between the enclosure and the sensor such that as the pressure within the enclosure is reduced, the actuator will lower the sensor from a first position to a second position relative to the enclosure and package.

In use, the apparatus performs a unique method of testing the fluid-tight sealed integrity of a hermetically-sealed package, which method includes the steps of: placing a package-to-be-tested within an enclosure, the package having a wall enclosing a fluid-containing chamber therewithin, a portion of the wall being movable in response to a pressure differential thereacross; reducing the pressure within the enclosure for permitting the fluid in the chamber to expand and for permitting the wall portion to move; sensing the displacement of the wall portion while the pressure within the enclosure is reduced; and comparing such sensed displacement of the wall portion with a predetermined value, and providing one signal if such sensed displacement of the wall portion is greater than the first predetermined value and another signal if such sensed displacement of the first wall portion is less than the predetermined value. This method may also include the further step of selectively lowering the sensor toward the package as the pressure within the enclosure is reduced.

If desired, the apparatus may be manifolded and used to test the sealed integrity of one or more multi-compartment packages. In this form, the apparatus, and the method performed thereby, may include the further step of: means for cross-comparing the sensed displacements of the two chambers for determining whether a change in the expanded volume of one chamber is accompanied by a proportionately-opposite change in the volume of the other chamber, this suggesting the probability of a leak between the two chambers.

Accordingly, the general object of the invention is to provide improved apparatus for, and methods of, testing the fluid-tight sealed integrity of a hermetically-sealed package.

Another object is to provide apparatus for, and a method of, testing for cross-compartment leakage in a multi-compartment hermetically-sealed package.

Still another object is to provide apparatus for, and a method of, quickly testing the fluid-tight sealed integrity of a hermetically-sealed package on a non-destructive basis.

These and other objects and advantages will become apparent from the foregoing and ongoing written specification, the drawings, and the appended claims.

DESCRIPTION OF THE PREFERRED EMBODIMENTS

Figure 1:
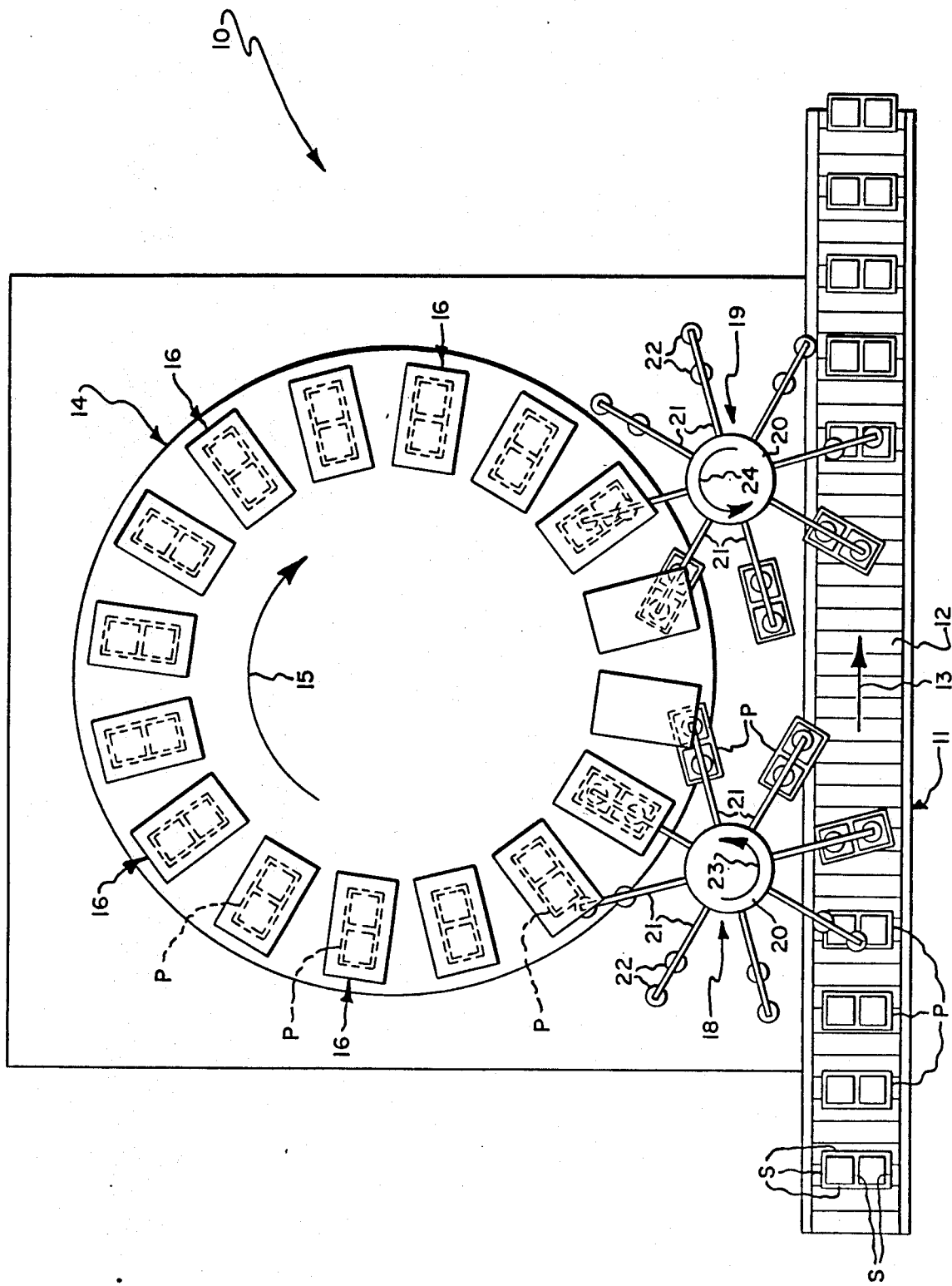
FIG. 1 is a schematic top plan view of apparatus incorporating a first form of the improved leak detector, this figure showing such apparatus as including a conveyor belt, a loading device, a turntable on which the test sequence is performed, an unloading device, and a plurality of packages positioned variously on the apparatus.

At the outset, it should be clearly understood that like reference numerals are intended to identify the same elements, portions and surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, etc.) together with the specification, and are to be considered as a portion of the entire "written description" of this invention, as required by 35 U.S.C. §112. As used in the following description, the terms "left", "right", "up" and "down", as well as adjectival and adverbial derivatives thereof (e.g., "leftwardly", "upwardly", etc.), simply refer to the orientation of the illustrated structure as the particular drawing figure faces the reader. Similarly, the terms "inwardly" and "outwardly" refer to the orientation of a surface relative to its axis of elongation, or axis of rotation, as appropriate.

Referring now to the drawings, the present invention provides several embodiments of improved apparatus for, and methods of, testing the fluid-tight sealed integrity of one or more hermetically-sealed packages. Such packages may typically include retort pouches, cartons, containers having flexible walls, as well as various other containers having rigid, semi-rigid or even relatively flexible or deformable walls, but having at least one wall which is flexible or movable in some fashion. However, the invention is considered to be potentially usable with virtually any type of sealed package having at least one chamber therewith, which chamber is filled with a fluid (i.e., a liquid, a gas, or a combination thereof), provided that a portion of the enclosing package wall can flex, move or deform in response to a pressure differential thereacross. The particular object, if any, within the chamber is not deemed to be critical, so long as the chamber contains a fluid therewithin.

FIRST EMBODIMENT (FIGS. 1-4)

Referring now to FIG. 1, a schematic of the improved apparatus is generally indicated at 10. This apparatus is shown as including a lowermost horizontal conveyor 11 having a belt 12 which travels from left to right in the direction of arrow 13; a turntable 14 which is arranged to be rotated by suitable means (not shown) in a clockwise direction, as indicated by arrow 15, at a speed such that the surface velocity of a plurality of leak detectors, severally indicated at 16, associated therewith will be substantially equal to the surface velocity of conveyor belt 12; a rotatable somewhat star-shaped loading device 18 for transferring packages-to-be-tested from the conveyor belt to the turntable; and a similar rotatable star-shaped unloading device 19 for returning tested packages from the turntable to the conveyor belt.

The loading and unloading devices 18,19 are shown as being structurally identical, although their respective operational sequences differ slightly. Specifically, each device has a central hub 20 mounted for rotation about a vertical axis (i.e., coming out of the paper in FIG. 1), with eight circumferentially-spaced arms, severally indicated at 21, extending radially outwardly therefrom. Each arm carries two suction cups, severally indicated at 22, one being arranged at the arm's distal end and the other being spaced slightly inwardly therefrom. The positions of these suction cups on the arms are matched to the size and shape of the packages which are to be tested, and may be readily changed or varied. The hubs of both devices 18,19 are arranged to be rotated in a counterclockwise direction, as indicated by arrows 23,24, by suitable means (not shown). As previously indicated, the velocities of the marginal end portions of arms 21 which carry the suction cups, are substantially equal to the surface speed of conveyor belt 12 and to the velocities of the leak detectors 16 on the turntable. Suitable means (not shown) are provided for selectively raising and lowering the arms and for selectively evacuating and venting the suction cups thereon, as a function of their angular position relative to the conveyor and the turntable. Thus, as packages travel rightwardly on the conveyor belt toward the turntable, one of the loading device arms will be lowered such that the suction cups thereon will physically contact that particular package while still traveling on the conveyor. Thereafter, the suction cups of that arm will be evacuated to grasp the package, and the arm will be raised while being simultaneously rotated away from the conveyor and toward the turntable. When properly positioned relative to the turntable, the arm will be lowered and the associated suction cups vented, thereby allowing the package to be deposited at a desired position on the turntable.

Once the package has been so transferred, the bell jar-like enclosure of an associated leak detector 16 will be lowered onto the turntable so as to enclose the package, and the test sequence described infra subsequently carried out, while the leak detector and the enclosed package rotate on the turntable. After completing this sequence, the enclosure will be selectively vented and lifted to an out-of-the-way position, and the unloading device 19 will be operated to return the tested package to the conveyor, if appropriate.

Therefore, in summary, a package traveling rightwardly on conveyor belt 12 will be picked up by the loading device 18 at its 6:00 o'clock position, lifted, rotated in a counterclockwise direction through an arc of approximately 150 degrees, lowered, and deposited synchronously on the turntable at the 1:00 o'clock position of the loading device. The package will be placed on the turntable at its 7:00 o'clock position, rotated in a clockwise direction through an arc of approximately 300 degrees, and removed at the 5:00 o'clock position of the turntable. During its excursion on the turntable, the enclosure will be lowered over the rotating package, the test sequence described infra carried out, and the enclosure again lifted to an overhead out-of-the-way position while the package is still rotating on the turntable. The package will then be engaged by the unloading device at the 11:00 o'clock position thereof, lifted, rotated in a counterclockwise direction through an arc of 150 degrees, lowered, and returned synchronously to the conveyor at the 6:00 o'clock position of the unloading device. Once returned to the conveyor, the tested package will resume its travel along belt 12 to subsequent stations (not shown).

Figure 2:
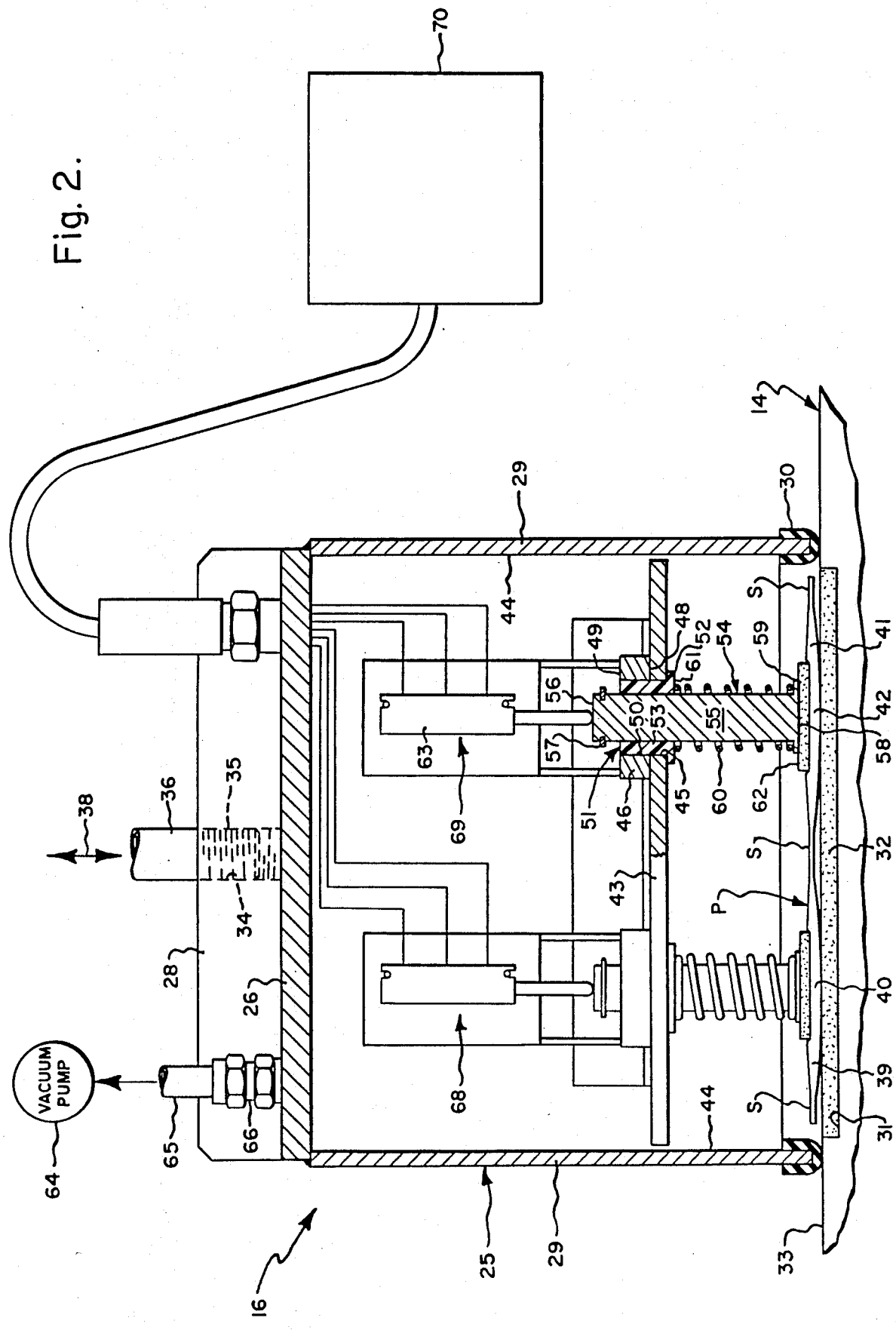
FIG. 2 is a fragmentary vertical sectional view of one of the improved leak detectors shown in FIG. 1, this view showing the enclosure as having been lowered on to the turntable, the first and second sensors, and a dual-compartment yeast package associated with such sensors, this view further showing the leftward plunger assembly in elevation and the rightward plunger assembly in vertical section.

With this overall operational sequence in mind, the reader's attention is now directed to FIG. 2, which illustrates one of the sixteen circularly-spaced leak detectors associated with the turntable. Each leak detector, generally indicated at 16, includes a bell jar-like enclosure 25 arranged to rotate with the turntable, and further arranged to be moved upwardly and downwardly relative thereto, somewhat in the manner of a carousel, in a predetermined manner related to the angular position of the turntable.

Specifically, enclosure 25 is shown as having an uppermost rectangular top provided with a horizontal wall 26 and a portion 28 rising upwardly therefrom, and as having a rectangular skirt 29 depending from the outer margins of the upper wall. A resilient cushion 30, having a somewhat U-shaped cross-section, graspingly captures the lower marginal end portion of skirt 29 and extends peripherally thereabout, to provide a fluid-tight seal when the enclosure is lowered onto the turntable, as shown in FIG. 2. If desired, the turntable may be provided with a plurality of rectangular recesses, one of which is indicated at 31 in FIG. 2, beneath each package to receive and accommodate a porous block 32. The upper surface of block 32 is shown as being substantially flush with the upper surface of the turntable, and its purpose is principally to permit fluid to escape from the underside of the package, which would otherwise engage the turntable imperforate upper surface 33. Were it otherwise, a leak through that portion of the package wall which would be in contact with the turntable surface, might be temporarily occluded and the results of that particular test rendered inaccurate.

Adverting now to FIG. 2, a tapped blind hole 34 extends downwardly into the upper portion of the enclosure to receive the externally-threaded marginal end portion 35 of a tubular rod 36, by which the entire enclosure may be selectively lifted or lowered relative to the turntable while rotating therewith. This capability of selective bi-directional vertical movement is indicated by the doubleheaded arrow 38 in FIG. 2. Of course, rod 36 is connected to a suitable mechanism (not shown) for selectively lifting the associated enclosure to an elevated out-of-the-way overhead position (not shown), or lowering it onto the upper surface of the table (as shown in FIG. 2) at the beginning of the test sequence. When so lowered on the turntable, the enclosure will surround a package-to-be-tested.

In the illustrated embodiment, the package-to-be-tested P is a multi-compartment hermetically-sealed package formed of a fluid-imperforate flexible foil-like material. Specifically, package P is shown as being a common yeast container, typically found in supermarkets. This type of package is somewhat pillow-shaped, and has two side-by-side chambers, each of which contains a quantity of yeast as well as fluid, typically air or some other gas. Package P appears to have a rectangular outline, when viewed in top plan (FIG. 1). The package is sealed along its outer margins, and in the middle, to define two side-by-side substantially square individual packets. The various package seals are indicated at S in FIGS. 1 and 2. As best shown in FIG. 2 each package may be regarded as having a first wall, collectively indicated at 39, enclosing the leftward first chamber 40, and as having a second wall, collectively indicated at 41, enclosing the rightward second chamber 42. In the illustrated form, the entire package wall within seals S is flexible. Hence, a portion of the first wall 39 is movable in response to a differential pressure across (i.e., between the first chamber and the space within the enclosure). Similarly, a portion of the second wall 41 is also movable in response to a pressure differential thereacross (i.e., between the second chamber and the space within the enclosure). While the first and second chambers have been described as containing yeast and air, the particular material or object therewithin, as well as the particular fluid therewithin, is not deemed to be critical. Suffice it to say that, as the pressure which acts on the outer surface of package P is reduced, the fluid within chambers 40,42 will expand, thereby urging walls 39,41 to flex or deform outwardly.

Still referring principally to FIG. 2, a horizontally-elongated rectangular shelf 43 is suitably secured, as by weldments (not shown) or fasteners (not shown), to the inner wall 44 of the enclosure. It should also be noted that the left and right ends of shelf 43 are spaced from the enclosure inner wall so that the pressure within the enclosure (i.e., above and below shelf 43) will be uniform. Shelf 43 is provided with two horizontally-spaced vertical through-holes, the rightward one of which is shown in cross-section and is indicated at 45. Each of these holes is vertically aligned with one of the package chambers. A cylindrical collar 46 has its annular horizontal lower face 48 engaging the marginal portion of shelf upper surface about hole 45, and has an opposite annular horizontal upper face 49, and has an inwardly-facing cylindrical surface 50 aligned with hole 45. This collar is secured to the shelf by suitable means (not shown).

A slide bushing, generally indicated at 51, has a lowermost annular flange portion 52 engaging the lower surface of shelf 43 about hole 45, and has a upwardly-extending thin-walled cylindrical tubular portion 53 arranged within the collar and shelf hole. Bushing 51 is preferably formed of a suitable low-friction material, such as polytetrafluoroethylene (i.e., Teflon ®), or the like. A snap ring 57 is received in an annular recess provided in the upper marginal end portion of plunger 56 and is arranged to engage the upper faces of the bushing and the collar to prevent the plunger from falling out when the enclosure is raised.

A plunger 54 is arranged within bushing 51 for vertical sliding movement therealong toward and away from the package chamber with which it is aligned. The plunger is shown as having an outwardly-facing cylindrical surface 55, and upper and lower horizontal circular end faces 56,58, respectively. Plunger 54 may be either hollow or solid (as shown), as desired. An annular washer-like flange 59 extends radially outwardly from plunger side surface 55 adjacent its lower end face. A coil spring 60 encircles the plunger, and has its upper marginal end arranged to bear against the annular horizontal lower end face 61 of the bushing. The lower marginal end of this spring is arranged to bear against plunger flange 59. Spring 60 is compressed between these two bearing surfaces, and continuously urges the plunger to move downwardly relative to the bushing and shelf, and into engagement with the package. A porous bearing block 62, somewhat akin to a foot, is mounted on the lower marginal end portion of the plunger. As with block 32, the function of block 62 is to prevent the occlusion of any holes or leaks in that portion of the package wall which would otherwise be engaged by an imperforate surface.

A position-sensing device, generally indicated at 63, is mounted on the enclosure and is arranged to sense the position of the upper end face of the plunger. In the preferred embodiment, device 63, which may be a linear variable displacement transducer (LVDT), will sense both the polarity and the magnitude of any plunger displacement, and will produce an electrical signal proportional thereto. Thus, when the pressure within the enclosure is reduced, as by the operation of a vacuum pump 64 through conduit 65 and fitting 66, the pressure within the enclosure will be reduced, and the fluid within each chamber of the package will begin to expand. Such expansion will overcome the downward bias of spring 60, and will move the plunger upwardly within slide bushing 51. This movement of the plunger will be sensed and determined by position-sensing device 63, which will, in turn, produce an analog electrical signal proportional to the magnitude and polarity of such change in plunger position. Thus, each plunger 54, and its associated position-sensing device 63, comprise a sensor which is arranged to sense the displacement of a movable wall portion of the associated package when the pressure within the enclosure is reduced, and is operable to provide an electrical signal proportional to the polarity and magnitude of such displacement. Of course, in FIG. 2, the leftward plunger and position-sensing device comprise a first sensor 68 associated with the leftward first chamber of the package, while the rightward plunger and position-sensing device comprise a second sensor 69 associated with the rightward second chamber of the package. If the package had a greater or lesser number of chambers, or if multiple packages were to be tested within a single enclosure, the number of such sensors would be increased or decreased accordingly.

The signals generated by the first and second sensors are supplied to a comparator 70, which compares the first sensor signal with a first predetermined value, and compares the second sensor signal with a second predetermined value. In the illustrated embodiment, these two predetermined values may be substantially the same because the volume within the two package chambers is nominally the same. However, if the package chambers were of different volumes, the first and second predetermined values would be appropriately increased or decreased.

Figure 3:
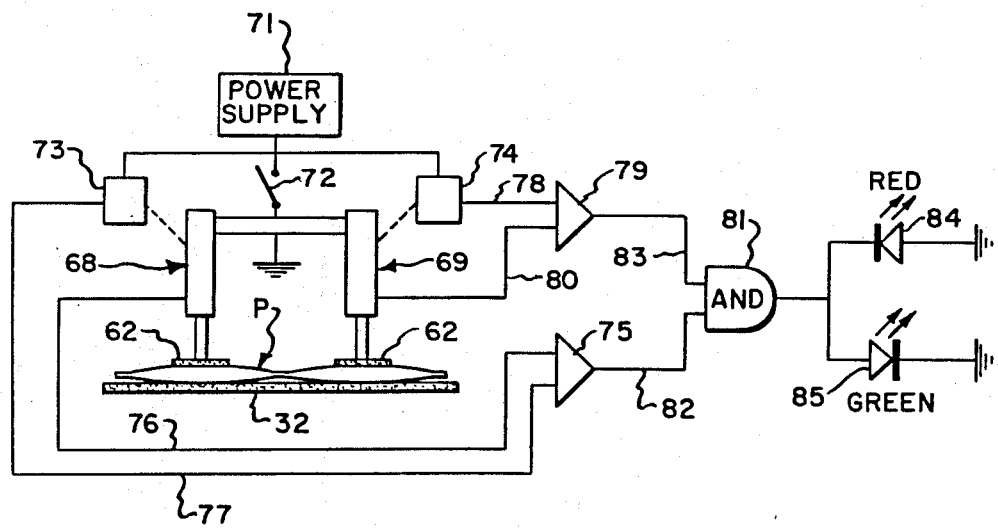
FIG. 3 is an electrical schematic of the comparator circuitry.

FIG. 3 is an electrical schematic of typical circuitry used to compare the sensed displacement of the flexible walls of the package, and to pass or reject a tested package. Electrical power is supplied from a suitable source 71 via test switch 72 to the first and second sensors 68,69, which are arranged in parallel. Such power is also supplied to a first potentiometer 73 associated with the first sensor 68, and to a second potentiometer 74 associated with the second sensor 69. Each of potentiometers 73,74 is independently variable, and may be selectively adjusted to set predetermined values. If the package chambers are of substantially equal volume, the predetermined values may be the same; if they are of different volumes, the predetermined values may be proportionately adjusted. If desired, each potentiometer may be operatively arranged with its associated sensor so as to provide a floating or trailing value of the signal generated by such sensor, this coupling being indicated by the dashed lines in FIG. 3. For example, the trailing value may be, say, 80% or 90%, of the magnitude of the signal generated by the associated sensor. This, of course, may be readily varied, as desired.

In any event, an electrical signal reflecting the first predetermined value, whether fixed or floating, is supplied from potentiometer 73 via line 77 to a first comparator 75. The electrical signal generated by first sensor 68 is supplied via line 76 as the other input to comparator 75. Similarly, an electrical signal reflecting the second predetermined value is supplied from potentiometer 74 via line 78 to a second comparator 79. The signal generated by second sensor 69 is supplied via line 80 as the other input to comparator 79. Thus, comparators 75,79 function to compare the signals generated by the associated sensors with the predetermined values provided by potentiometers 73,74, respectively. An AND gate 81 receives the output of comparator 75 via line 82, and also receives the output of comparator 79 via line 83. The output of AND gate 81 is, in turn, supplied to a red LED 84 and to green LED 85, which indicates whether the package has failed or passed the test.

Thus, at the beginning of the test sequence, switch 72 is closed, and the appropriate signals are supplied to comparators 75,79 as the space within the enclosure is evacuated. As the pressure is reduced, the movable wall portions of the package expand outwardly, producing a corresponding movement of the plungers, and a proportional variation of the signals in lines 76,80. After the pressure within the enclosure has been reduced to a sufficient level, the vacuum pump stops and the distended positions of the movable wall portions are monitored. If there is no leak through the package walls, the movable wall portions will remain distended, and the green LED 85 will be illuminated, this indicating that the package has passed the test. On the other hand, if the distended movable wall of either chamber begins to collapse, the red LED will be illuminated, this indicating that the package has failed the test. Thus, the red LED will be illuminated if gas escapes from the package into the enclosure, or if gas escapes from one chamber into the other.

Figure 4:
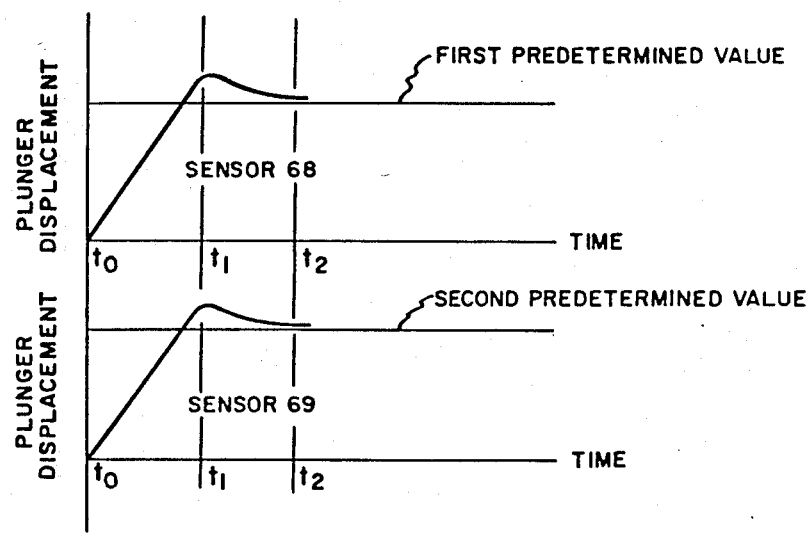
FIG. 4 is a graph of plunger displacement (ordinate) versus time (abscissa), showing typical curves for one possible test sequence.

FIG. 4 is a graph comparatively showing the typical plunger displacement (ordinate) versus time (abscissa) characteristics of sensors 68,69. At time $t_0$, the vacuum pump is operated to begin to reduce the pressure within the enclosure. As this happens, the fluid within each chamber begins to expand, pushing the movable wall portion outwardly. This is determined by the associated sensor. At time $t_1$, the pressure within the enclosure has been reduced to a predetermined level, and the vacuum pump is turned off. The reduced pressure within the enclosure is held constant from time $t_1$ to $t_2$ to determine whether there has been any relaxation of the distended package wall portions. During this time interval, each plunger may settle slightly for reasons not attributable to a leak. If the signals produced by sensors 68,69 do not fall below the first and second predetermined values, respectively, the green LED will be illuminated, thus indicating that that particular package has passed the test. However, if the signal produced by either sensor falls below its predetermined value, the package will have failed the test and the red LED will be illuminated. These "pass" or "fail" indicators may be operatively coupled with the unloading devices such that a failed package will not be returned to the conveyor.

SECOND EMBODIMENT (FIGS. 5-7)

Figure 5:
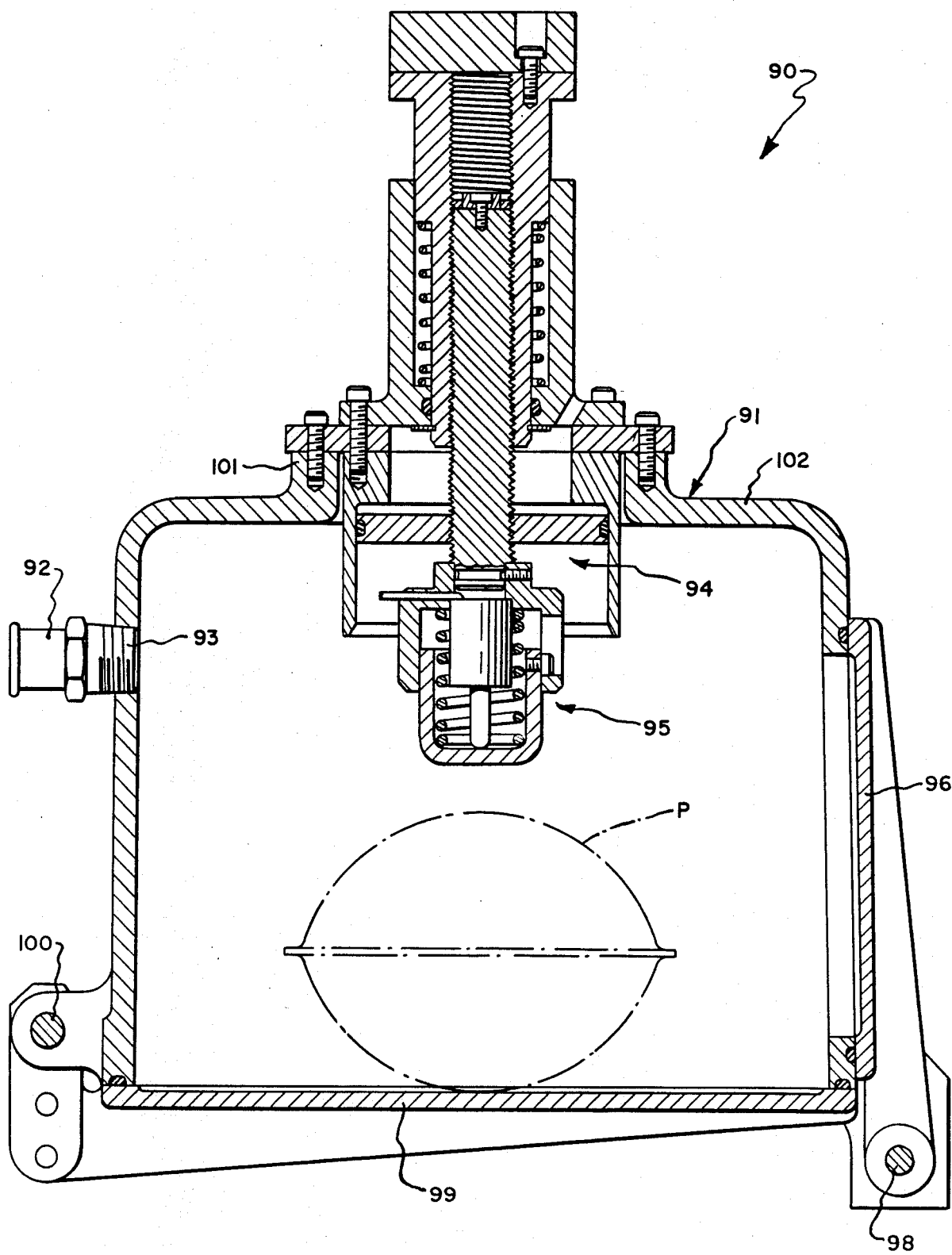
FIG. 5 is a fragmentary vertical sectional view of a second form of the improved leak detector, this embodiment having a box-like enclosure and an actuator for automatically lowering the sensor toward the package when the pressure within the enclosure is initially reduced, this view also showing the actuator as being in its upper-out-of-the-way first position relative to the enclosure.
Figure 6:
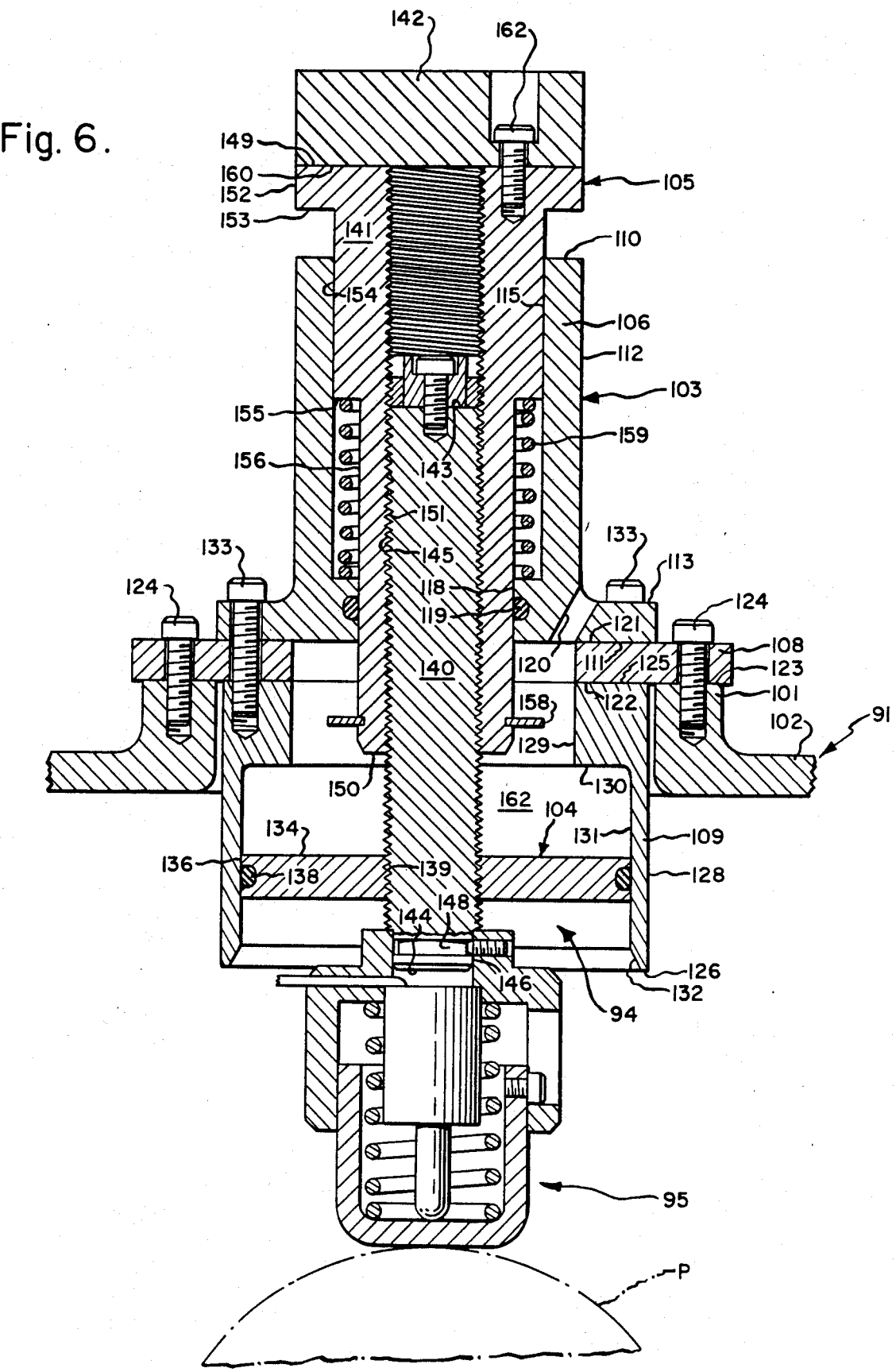
FIG. 6 is an enlarged view of the actuator portion of the leak detector shown in FIG. 5, and depicts the actuator as being intermediate its first and second positions relative to the enclosure.
Figure 7:
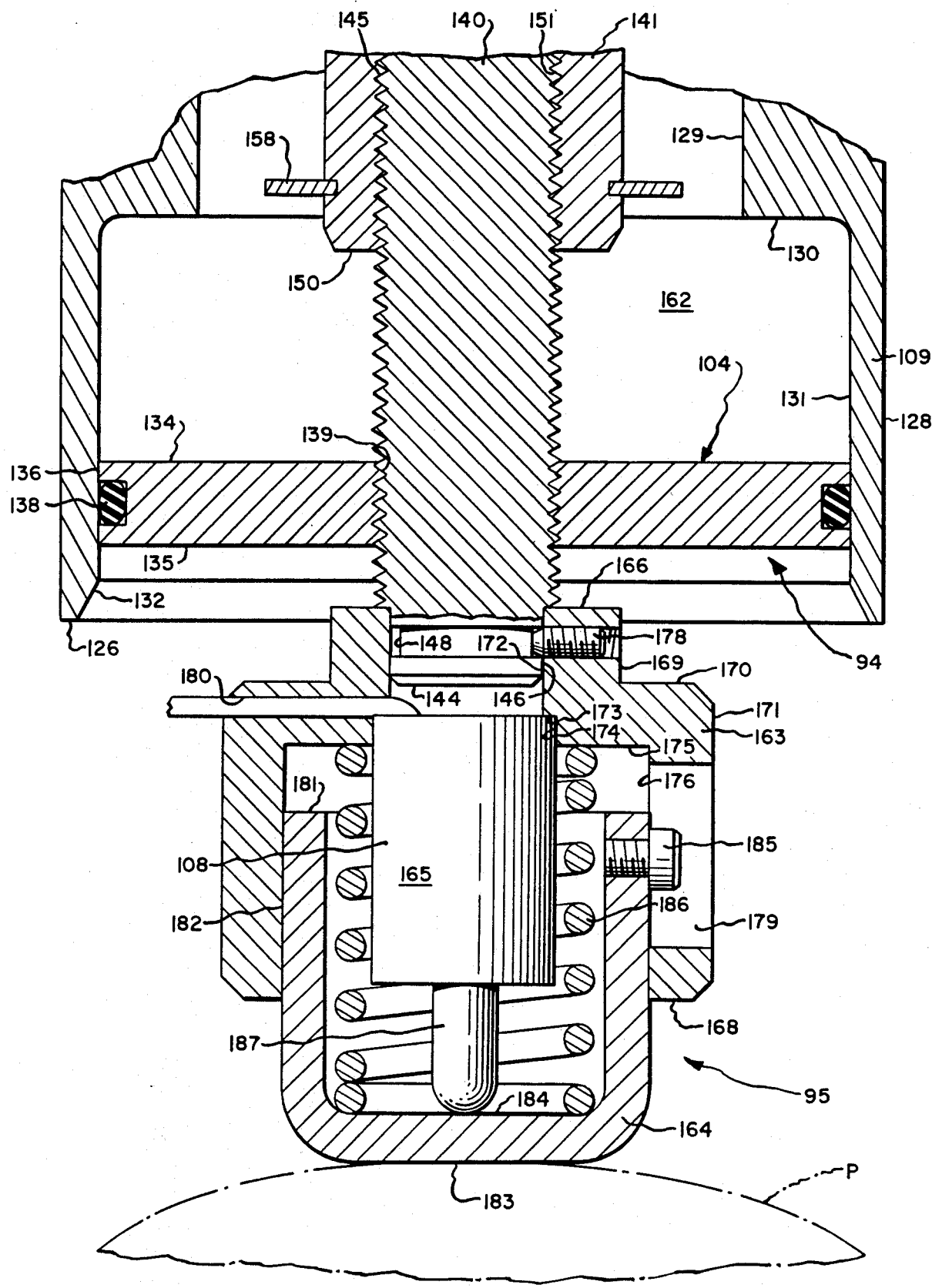
FIG. 7 is a further enlarged view of the sensor shown in FIGS. 5 and 6 when the actuator is in its lowered or second position relative to the enclosure.

A second embodiment of the improved leak detector, generally indicated at 90, is fragmentarily illustrated in FIGS. 5-7.

This second embodiment broadly includes an enclosure 91, a vacuum pump (not shown) communicating with the interior of the enclosure via conduit 92 and fitting 93 and selectively operable to reduce the pressure within enclosure; an actuator 94 mounted on the enclosure for movement toward and away from the package; a sensor 95 mounted on the lower marginal end of the actuator and operatively arranged to sense the position of the movable wall portion of a package P within the enclosure when the pressure within the enclosure has been reduced to a desired level; and a comparator (not shown), similar to comparator 70, for comparing the sensor output signal with a predetermined value.

In this second embodiment, the enclosure is depicted as being a generally-rectangular box-like structure having a rightward entrance door 96 pivoted about lower pin 98, and having a lower trap or exit door 99 pivoted about a leftward pin 100. As the enclosure rotates on a turntable (not shown) or similar device (not shown), suitable camming mechanisms (not shown) selectively open and close the entrance and exit doors in a predetermined sequence to receive and discharge various packages-to-be-tested. In any event, the enclosure is shown as having an integrally-formed cylindrical collar 101 rising upwardly from its upper surface 102.

As best shown in FIG. 6, actuator 94 broadly includes a three-piece body assembly, generally indicated at 103, mounted on the enclosure and penetrating collar 101; a piston 104; and an actuator rod assembly 105 mounted on the piston for vertical movement therewith relative to the enclosure and toward and away from a package being tested.

The actuator body 103 is shown as including an upper part 106, an intermediate flange part 108, and a lower part 109 arranged within the enclosure. Upper part 106 is shown as being a vertically-elongated stepped tubular member having an annular horizontal upper end face 110, an annular horizontal lower end face 111, and an outer surface which sequentially includes an outwardly-facing vertical cylindrical surface 112 extending downwardly from upper end face 110, an upwardly-facing annular horizontal surface 113, and an outwardly-facing vertical cylindrical surface 114 continuing downwardly therefrom to join lower end face 111. The inner surface of upper part 106 is shown as sequentially including an inwardly-facing vertical cylindrical surface 115 extending downwardly from upper end face 110, an upwardly-facing annular horizontal surface 116, and an inwardly-facing vertical cylindrical surface 118 continuing downwardly therefrom to join lower end face 111. An annular groove extends radially into part 106 from surface 118 to receive and accommodate an O-ring 119. An upwardly- and rightwardly-inclined vent opening 120 communicates surfaces 111, 113 for a purpose hereinafter explained.

The body intermediate part 108 is shown as being a washer-like member having an annular horizontal upper surface 121 engaging the lower end face of upper part 106, and having an annular horizontal lower face engaging the upper surface 123 of enclosure collar 101. The body intermediate part is provided with a plurality of holes to receive and accommodate a number of fasteners, severally indicated at 124, by which the intermediate part may be secured to the enclosure collar 101.

The body lower part is also shown as being a vertically-elongated stepped tubular member. Specifically, lower part 109 has an annular horizontal upper end face 125, an annular horizontal lower end face 126, and has an outwardly-facing vertical cylindrical surface 128 extending therebetween. The upper end face 125 of lower part 109 is arranged to abut the lower face of intermediate part 108. The lower part has an inner surface which sequentially includes an inwardly-facing vertical cylindrical surface 129 extending downwardly from upper face 125, a downwardly-facing annular horizontal surface 130, an inwardly-facing vertical cylindrical surface 131, and an inwardly- and downwardly-facing frusto-conical surface 132 continuing downwardly therefrom to join lower end face 126. A plurality of fasteners, severally indicated at 133, hold the three body parts together.

Piston 104 is shown as being arranged within the body lower part 109. Specifically, the piston has annular horizontal upper and lower faces 134,135, and an outwardly-facing vertical cylindrical surface 136 extending therebetween. An annular recess extends radially into the piston from surface 136 to receive and accommodate an O-ring 138, which sealingly and slidably engages lower body part cylindrical surface 131. The piston is also provided with a vertical through-bore, which is internally-threaded as indicated at 139.

The actuator rod assembly 105 is shown as including an actuator rod 140, a tubular guide 141, and an uppermost end cap 142. The actuator rod 140 is shown as being a solid member having an annular horizontal upper end face 143, a horizontal circular lower end face 144, and an external surface which sequentially includes an externally-threaded portion 145 extending downwardly from upper face 143, and an outwardly-facing vertical cylindrical portion 146 continuing downwardly therefrom to join lower end face 144. An annular groove 148 extends radially into the actuator rod from surface 146 for a purpose hereinafter explained.

The tubular guide 141 is shown as having an annular horizontal upper end face 149, an annular horizontal lower end face 150, and an internally-threaded vertical through-bore 151. The outer surface of this member sequentially includes an outwardly-facing vertical cylindrical surface 152 extending downwardly from upper end face 149, a downwardly-facing annular horizontal surface 153, an outwardly-facing vertical cylindrical surface 154, a downwardly-facing annular horizontal surface 155, and an outwardly-facing vertical cylindrical surface 156 continuing downwardly therefrom to join lower end face 150. Surface 156 is sealingly and slidably engaged by O-ring 119. A retaining ring 158 is received in a suitable annular groove extending into the rod guide from its surface 156 adjacent its lower end face 150. A coil spring 159 has its lower end arranged to bear against body surface 116, and has its upper end arranged to bear against rod guide surface 155. Spring 159 is compressed, and continuously urges the rod guide, together with the rod and sensor, to move upwardly relative to the enclosure. As shown, the rod 140 is matingly received in the rod guide, and in the piston.

The end cap 142 is shown as having a circular horizontal lower end face 160 engaging the upper end face 149 of the rod guide. End cap 142 is suitably secured to the rod guide by means of a fastener 161. Thus, the actuator rod assembly 105 forms with piston 104 an annular chamber 162 between the actuator rod, the body and the piston, which chamber communicates with atmospheric pressure via vent opening 120.

Referring now to FIG. 7, sensor 95 is shown as being mounted on the lower marginal end portion of the actuator rod for vertical movement therewith toward and away from a particular package being tested. The sensor is shown as having two relatively-movable parts 163,164, with a sensing transducer, such as an LVDT 165, interposed therebetween. The sensor upper part 163 is shown as having an annular horizontal upper end face 166, an annular horizontal lower end face 168, and an outer surface which sequentially includes an outwardly-facing vertical cylindrical surface 169 extending downwardly from upper face 166, an upwardly-facing annular horizontal surface 170, and an outwardly-facing vertical cylindrical surface 171 continuing downwardly therefrom to join lower end face 168. The upper part 163 is shown as having a stepped vertical through-bore which sequentially includes an inwardly-facing vertical cylindrical surface 172 extending downwardly from upper end face 166, a downwardly-facing horizontal annular surface 173, an inwardly-facing vertical cylindrical surface 174, a downwardly-facing annular horizontal surface 175, and an inwardly-facing vertical cylindrical surface 176 continuing downwardly therefrom to join lower end face 168. The lower marginal end portion of the actuator rod 140 is received within sensor upper part bore 172. A tapped radial hole extends between surfaces 169,172 to receive a set screw 178, the nose of which is received in groove 148 and by which sensor part 163 is mounted fast to the actuator rod. Sensor part 163 is further shown as being provided with a vertically-elongated rectangular slot 179, and with a leftwardly-extending radial opening 80 to accommodate passage of conductor wires to the LVDT.

Sensor lower part 164 is shown as being a vertically-elongated cup-shaped member having an annular horizontal upper end face 181. The outwardly-facing cylindrical side surface 182 of this part slidably engages sensor upper part surface 176. The sensor lower part 164 is further provided with a circular horizontal lower end face 183. As previously indicated, part 164 is cup-shaped and has an upwardly-facing horizontal bottom surface 184. A fastener 185 is received in a radial tapped hole provided in sensor part 164, and is arranged for movement within slot 179.

A coil spring 186 has its upper end arranged to bear against surface 175, and has its lower end arranged to bear against surface 184. Spring 186 is compressed, and continuously urges the sensor lower part 164 to move downwardly relative to the sensor upper part 163 within the confines of slot 179. The LVDT 165 is shown as having a core 187 movable with sensor lower part 164, and as having a coil 188 movable with sensor upper part 163.

When the pressure within enclosure 91 is at atmospheric pressure, spring 159 causes the actuator rod and the connected sensor, to move upwardly relative to the enclosure, to the position shown in FIG. 5. Such upward motion of the actuator rod relative to the enclosure is limited by the presence of retaining ring 158, which will engage surface 111 to prevent further upward movement of the rod. As the leak detector 90 rotates, the entrance 96 is selectively opened to permit insertion of a package-to-be-tested. Thereafter, the entrance door 96 is closed, and the vacuum pump is selectively operated to reduce the pressure within the enclosure. Since the lower face 135 of the piston is exposed to the pressure within the enclosure, while the upper face 134 thereof is continuously exposed to atmospheric pressure, as the pressure within the enclosure is reduced, the pressure differential across the piston creates a force which causes the piston and actuator rod to move downwardly relative to the enclosure and toward the package. Such downward movement of the actuator rod is limited by the fact that surface 153 will abut surface 110. Thus, as the vacuum pump is operated to reduce the pressure within the enclosure, the actuator moves from the first position shown in FIG. 5 to a second position at which surface 153 abuts surface 110. At the same time, however, the reduced pressure within the enclosure permits any gas within the package to expand, thereby bowing the movable wall portion of the package outwardly. Such distention of the package wall is sensed by relative movement between the sensor parts 163,164, and between LVDT parts 186,188, respectively. The electrical analog of such signal is supplied via the LVDT conductor leads to the comparator (not shown) within which such sensed signal is compared with a predetermined value, as in the first embodiment.

After the test sequence has been completed, the pressure within the enclosure is permitted to equalize with atmospheric pressure by suitable means (not shown). When this occurs, compressed spring 159 will urge the actuator rod and sensor to move upwardly relative to the enclosure. Finally, at the end of the test sequence, the exit door is selectively opened to permit the tested package to fall therefrom.

Therefore, in this embodiment, when the pressure within the enclosure is reduced, the package begins to expand, and the actuator rod and sensor are moved downwardly toward the such expanding package. Once the actuator rod has reached the limit of its downward stroke, as by surface 153 abutting surface 110, any further expansion of the package will be sensed and determined by the relatively-movable sensor parts, and an electrical signal reflective of such additional displacement, may be provided to the comparator. When the pressures within and without the enclosure are permitted to equalize, compress spring 159 will elevate the actuator rod to its out-of-the-way position.

MODIFICATIONS

The illustrated embodiments shows some, but not all, possible forms, which the various parts and components of the improved apparatus may take. For example, the shape of the enclosure may be readily varied, as has been demonstrated. The first and second sensors may include plungers, proximity sensors, LVDT's, and the like. In a crude form, the sensor may even be a dial indicator, providing a visual signal proportional to the amount of displacement of the package's movable wall portion. While in the preferred embodiment, the plunger is shown as physically contacting the package's movable wall portion, in other embodiments, non-contacting sensors may be used in lieu thereof. The materials of construction are not deemed to be critical.

Therefore, while two presently-preferred embodiments of the improved apparatus have been shown and described, and several modifications thereof discussed, persons skilled in this art will recognize that various additional changes and modifications may be made without departing from the spirit of the invention, as defined and differentiated by the following claims.

What is claimed is:

1. A leak detector for testing the fluid-tight sealed integrity of a hermetically-sealed package, comprising:
   an enclosure;
   a package-to-be-tested arranged within said enclosure, said package having a wall enclosing a chamber therewithin, a portion of said wall being movable in response to a pressure differential thereacross;
   a vacuum pump selectively operable to reduce the pressure within said enclosure for permitting the fluid within said chamber to expand and for permitting said wall portion to move;
   an actuator mounted on said enclosure, said actuator having a cylinder mounted on said enclosure and having a piston operatively arranged in said cylinder for sealed sliding movement therealong toward and away from said wall portion, said cylinder having a first stop arranged to limit further movement of said piston toward said package and having a second stop arranged to limit further movement of said piston away from said package, said piston having one face continuously exposed to the pressure within said enclosure and having its opposite face continuously exposed to atmospheric pressure, said actuator also including a spring acting between said piston and cylinder and urging said piston to move away from said package, said actuator being in a first position relative to said enclosure when the pressure within said enclosure is at atmospheric pressure and being in a second position relative to said enclosure when the pressure within said enclosure is at a predetermined negative pressure;

a sensor mounted on said actuator and operatively arranged to sense displacement of said first wall portion when said actuator is in said second position and when the pressure within said enclosure is further reduced below said predetermined negative pressure, said sensor being operable to provide a signal as a function of such sensed displacement of said first wall portion; and a first comparator arranged to compare said sensor signal with a predetermined value, and operable to provide one signal if said sensor signal is greater than said predetermined value and another signal if said sensor signal is less than said predetermined value.

2. A leak detector as set forth in claim 1 wherein said sensor has two relatively-movable parts, and wherein one of said parts is mounted on the distal end of said rod.

3. The method of testing the fluid-tight sealed integrity of a hermetically-sealed package, comprising the steps of:

placing a package-to-be-tested within an enclosure, said package having a wall enclosing a chamber therewithin, a portion of said wall being movable in response to a pressure differential thereacross, said chamber containing a fluid;

reducing the pressure within said enclosure for permitting the fluid within said chamber to expand and for permitting said wall portion to move;

moving a sensor to a predetermined position relative to said package solely in response to the differential between the pressure within said enclosure and atmospheric pressure;

sensing the displacement of said wall portion while the pressure within said enclosure is further reduced;

comparing such sensed displacement of said wall portion with a predetermined value; and providing one signal if such sensed displacement of said wall portion is greater than said predetermined value, and another signal if such sensed displacement of said wall portion is less than said predetermined value.

* * * * *